US010408084B2

(12) United States Patent
Thomas et al.

(10) Patent No.: US 10,408,084 B2
(45) Date of Patent: Sep. 10, 2019

(54) VANE ASSEMBLY FOR A GAS TURBINE ENGINE

(71) Applicants: Rolls-Royce Corporation, Indianapolis, IN (US); Rolls-Royce North American Technologies, Inc., Indianapolis, IN (US)

(72) Inventors: David J. Thomas, Brownsburg, IN (US); Ted J. Freeman, Danville, IN (US); Jeffrey A. Walston, Indianapolis, IN (US); Andrew J. Lazur, Huntington Beach, CA (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 645 days.

(21) Appl. No.: 15/056,345

(22) Filed: Feb. 29, 2016

(65) Prior Publication Data
US 2016/0258320 A1 Sep. 8, 2016

Related U.S. Application Data

(60) Provisional application No. 62/127,061, filed on Mar. 2, 2015.

(51) Int. Cl.
| F01D 5/14 | (2006.01) |
| F01D 5/18 | (2006.01) |
| F01D 5/28 | (2006.01) |
| F01D 9/04 | (2006.01) |
| F01D 9/06 | (2006.01) |
| F01D 25/00 | (2006.01) |

(52) U.S. Cl.
CPC .......... F01D 25/005 (2013.01); F01D 5/189 (2013.01); F01D 5/282 (2013.01); F01D 5/284 (2013.01);
(Continued)

(58) Field of Classification Search
CPC .......... F01D 5/147; F01D 5/188; F01D 5/189; F01D 5/282; F01D 5/284; F01D 9/041;
(Continued)

(56) References Cited

U.S. PATENT DOCUMENTS 3,741,681 A * 6/1973 De Witt .................. F01D 5/081
416/193 A
5,071,059 A * 12/1991 Heitman ................ B23K 11/10
219/76.13
(Continued)

FOREIGN PATENT DOCUMENTS

| EP | 1930548 A2 | 6/2008 |
| EP | 2500548 A1 | 9/2012 |

OTHER PUBLICATIONS

Extended European Search, European Application No. 16157888.5-1610, dated Aug. 8, 2016, 6 pages.

*Primary Examiner* — Woody A Lee, Jr.
*Assistant Examiner* — Christopher R Legendre
(74) *Attorney, Agent, or Firm* — Barnes & Thornburg LLP (57) ABSTRACT

A vane assembly for a gas turbine engine is disclosed herein. The vane assembly includes an inner platform, an outer platform, and a ceramic-containing airfoil that extends from the inner platform to the outer platform. The ceramic-containing airfoil is manufactured to have radially discontinuous ribs spaced radially apart from one another between the inner platform and the outer platform.

13 Claims, 9 Drawing Sheets

(52) U.S. Cl.
CPC ............. *F01D 9/041* (2013.01); *F01D 9/065* (2013.01); *F01D 5/147* (2013.01); *F05D 2220/32* (2013.01); *F05D 2230/23* (2013.01); *F05D 2230/60* (2013.01); *F05D 2240/80* (2013.01); *F05D 2300/6012* (2013.01); *F05D 2300/6033* (2013.01); *Y02T 50/672* (2013.01)

(58) Field of Classification Search
CPC .................. F01D 9/065; F05D 2240/12; F05D 2300/6012; F05D 2300/6033
See application file for complete search history.

(56) References Cited

U.S. PATENT DOCUMENTS

| | | | |
|---|---|---|---|
| 5,120,192 A * | 6/1992 | Ohtomo | F01D 5/189 415/115 |
| 6,280,550 B1 | 8/2001 | Steibel et al. | |
| 6,514,046 B1 * | 2/2003 | Morrison | F01D 5/187 416/229 A |
| 7,066,717 B2 * | 6/2006 | Morrison | F01D 5/187 29/889.71 |
| 7,255,535 B2 | 8/2007 | Albrecht et al. | |
| 7,258,530 B2 | 8/2007 | Morrison et al. | |
| 7,435,058 B2 | 10/2008 | Campbell et al. | |
| 7,600,978 B2 | 10/2009 | Vance et al. | |
| 7,887,300 B2 | 2/2011 | Mazzola et al. | |
| 8,167,573 B2 | 5/2012 | Merrill et al. | |
| 8,235,670 B2 | 8/2012 | Morrison et al. | |
| 2008/0124512 A1 * | 5/2008 | Steibel | C04B 35/573 428/105 |
| 2010/0166565 A1 | 7/2010 | Uskert et al. | |
| 2012/0279631 A1 * | 11/2012 | Mizokami | B29C 70/30 156/60 |
| 2016/0258320 A1 * | 9/2016 | Thomas | F01D 9/065 |

* cited by examiner

VANE ASSEMBLY FOR A GAS TURBINE ENGINE

CROSS REFERENCE TO RELATED APPLICATIONS

This application claims priority to and the benefit of U.S. Provisional Patent Application No. 62/127,061, filed Mar. 2, 2015, the disclosure of which is now expressly incorporated herein by reference.

FIELD OF THE DISCLOSURE

The present disclosure relates generally to vanes used in gas turbine engines, and more specifically to vanes used in gas turbine engines that contain composite materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over airfoils included in stationary vanes and rotating blades of the turbine. The interaction of combustion products with the airfoils heats the airfoils to temperatures that require the airfoils to be made from high-temperature resistant materials and/or to be actively cooled by supplying relatively cool air to the vanes and blades. To this end, some airfoils for vanes and blades are incorporating composite materials adapted to withstand very high temperatures. Design and manufacture of vanes and blades from composite materials presents challenges because of the geometry and strength required for the parts.

SUMMARY

The present disclosure may comprise one or more of the following features and combinations thereof.

According to an aspect of the present disclosure, a vane assembly for a gas turbine engine may include inner and outer platforms spaced apart from one another to define a gas path therebetween and a ceramic-matrix composite airfoil that extends from the inner platform to the outer platform across the gas path. The ceramic-matrix composite airfoil may be formed to include a pressure side, a suction side, and a plurality of axially-aligned ribs spaced radially apart from one another between the inner platform and the outer platform that interconnect the pressure side with the suction side.

In illustrative embodiments, the ceramic-matrix composite airfoil may include a core comprising ceramic-containing reinforcements and an overwrap. The core may have a first tube formed to include windows and a second tube formed to include windows. The overwrap may wraps around the core to form the pressure side and the suction side of the airfoil. The windows of the second tube may be aligned with the windows of the first tube so that the plurality of axially-aligned ribs are formed by material of the first tube and the second tube arranged between the windows of the first tube and the windows of the second tube.

In illustrative embodiments, the first tube and the second tube may extend substantially all the way from the inner platform to the outer platform.

In illustrative embodiments, the first tube may be woven or braided so that the first tube does not have a seam that extends radially between the inner platform and the outer platform. In some such embodiments, the second tube may be woven or braided so that the second tube does not have a seam that extends radially between the inner platform and the outer platform.

In illustrative embodiments, the first tube may be made from at least one wrapped ply of ceramic-containing reinforcement arranged to form a seam that extends radially between the inner platform and the outer platform. In some such embodiments, the seam may be arranged generally opposite the windows formed in the first tube.

In illustrative embodiments, the second tube may be made from at least one wrapped ply of ceramic-containing reinforcement arranged to form a seam that extends radially between the inner platform and the outer platform. In some such embodiments, the second tube may be coupled to the first tube by a plurality of stitches to generally fix the windows of the second tube in alignment with the windows of the first tube.

In illustrative embodiments, the material of the first tube arranged between the windows of the first tube may be substantially in contact with the material of the second tube arranged between the windows of the second tube. In some such embodiments, the material of the first tube arranged between the windows of the first tube may be bonded to the material of the second tube arranged between the windows of the second tube by ceramic matrix material.

In illustrative embodiments, the overwrap may include at least one ply of ceramic-containing reinforcement that wraps around the core and is bonded to the core by ceramic matrix material. The at least one ply of ceramic-containing reinforcement included in the overwrap may extend from along a trailing edge of the airfoil around a leading edge of the airfoil and back to the trailing edge of the airfoil to form a seam along the trailing edge of the airfoil.

According to another aspect of the present disclosure, a ceramic-matrix composite airfoil adapted for use in a gas turbine engine may include a core and an overwrap. The overwrap may wrap around the core to form the pressure side and the suction side of the airfoil.

In illustrative embodiments, the core may comprise ceramic-containing reinforcements and may include a first tube formed to include windows and a second tube formed to include windows. The windows of the second tube may be aligned with the windows of the first tube so that the plurality of axially-aligned ribs are formed by material of the first tube and the second tube arranged between the windows of the first tube and the windows of the second tube.

In illustrative embodiments, the first tube may be woven or braided so that the first tube does not have a seam that extends radially between the inner platform and the outer platform.

In illustrative embodiments, the first tube may be made from at least one wrapped ply of ceramic-containing reinforcement arranged to form a seam that extends radially between the inner platform and the outer platform. In some such embodiments, the seam may be arranged generally opposite the windows formed in the first tube.

In illustrative embodiments, each of the plurality of axially-aligned ribs may include material of the first tube and the second tube.

According to another aspect of the present disclosure, a method of making a ceramic-matrix composite airfoil for use in a gas turbine engine is taught. The method may include wrapping an overwrap around a core to define a pressure side and a suction side of the airfoil that are interconnected by the plurality of ribs. The method may also include co-processing the core and the overwrap to bond the core and the overwrap with ceramic matrix material.

In illustrative embodiments, the method may include aligning radially-spaced windows formed in a first tube comprising ceramic-containing reinforcements with radially-spaced windows formed in a second tube comprising ceramic-containing reinforcements to form a core having a plurality of ribs spaced radially apart from one another.

In illustrative embodiments, the method may include forming the windows by milling the first tube and the second tube after prehardening of the ceramic-containing reinforcements, removing of fugitive fibers woven into the first tube and the second tube, and/or pushing a punch through fibers of the first tube and the second tube to spread the fibers apart.

In illustrative embodiments, the method may include coupling the first tube to the second tube with stitches arranged adjacent to the windows.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figures 1, 2:
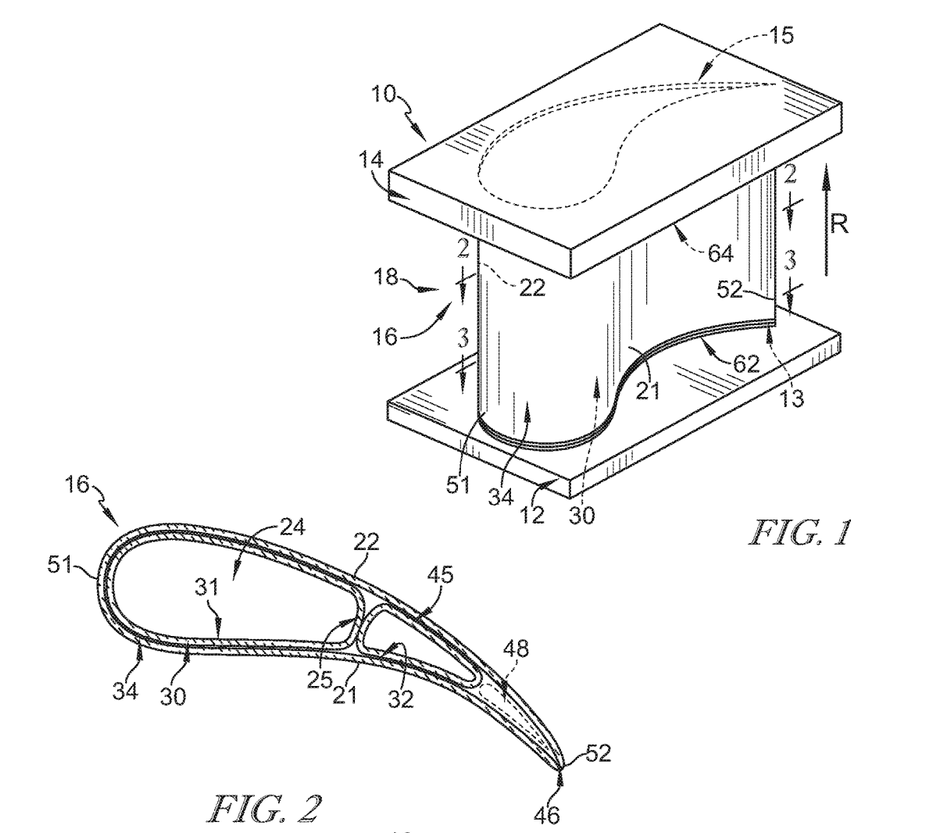
FIG. 1 is perspective view of a vane assembly adapted for use in a gas turbine engine showing that the vane assembly includes an inner platform, an outer platform, and an airfoil that extends from the inner platform to the outer platform.
FIG. 2 is a cross sectional view of the airfoil shown in FIG. 1 taken at line 2-2 showing that the airfoil includes an outer wrap that forms a pressure side and a suction side of the airfoil and a core having a rib extending from the pressure side to the suction side.

An illustrative turbine vane assembly 10 for use in a gas turbine engine is shown in FIG. 1. The turbine vane 10, sometimes simply called a turbine vane or vane 10, includes an inner platform 12, an outer platform 14, and an airfoil 16. The inner platform 12 and outer platform 14 are spaced apart in a radial direction R from one another and cooperate to define a flow path 18 for hot high pressure gasses moving through the turbine section of a gas turbine engine. The airfoil 16 extends in the radial direction R from the inner platform 12 to the outer platform 14 across the flow path 18 to interact with hot gasses moving through the flow path 18.

The airfoil 16 illustratively comprises ceramic-matrix composite materials adapted to withstand high temperatures and is shaped to redirect hot gasses before those gasses act on rotating blades arranged aft of the airfoil 16 as suggested in FIG. 1. The airfoil 16 is formed to include a pressure side 21, a suction side 22, and a plurality of ribs 25 that extend through an interior space 24 of the airfoil 16 as shown in FIG. 2. The ribs 25 are illustratively spaced radially apart from one another between the inner platform 12 and the outer platform 14 while remaining axially aligned as suggested in FIGS. 2 and 3.

Figure 3:
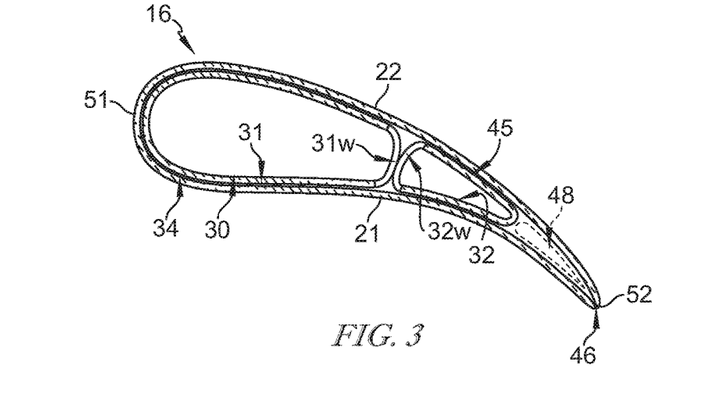
FIG. 3 is a cross sectional view of the airfoil shown in FIG. 1 taken at line 3-3 showing that the core does not form the rib throughout the airfoil such that ribs formed by the core are radially discontinuous.
Figure 4:
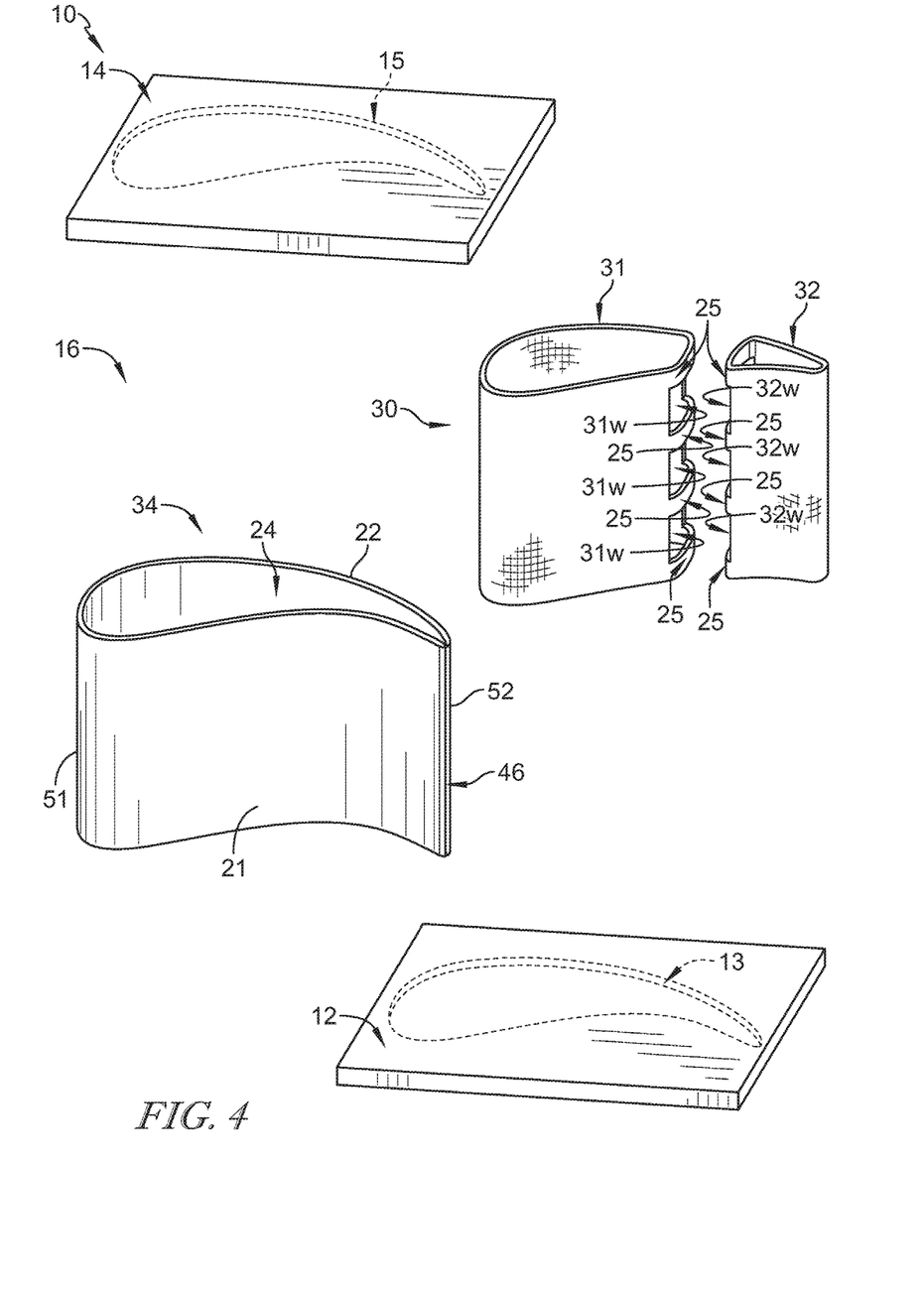
FIG. 4 is an exploded perspective assembly view of the vane assembly of FIGS. 1-3 showing that the core includes a first tube formed to include windows and a second tube formed to include windows.

The illustrative airfoil includes a core 30 and an overwrap 34 as shown in FIG. 4. The core 30 includes a first and a second tube of ceramic-containing reinforcement material 31, 32 each formed to include windows 31W, 32W that are aligned with one another so that material of the first tube 31 and the second tube 32 arranged between the windows 31W, 32W form the ribs 25. The overwrap 34 wraps around the core 30 to hold the core 30 together and to form the pressure side 21 and the suction side 22 of the airfoil 16. When assembled, the core 30 and the overwrap 34 are bonded together by ceramic matrix 45 as suggested in FIGS. 2 and 3.

The first tube 31 and the second tube 32 of the core 30 illustratively extend all the way from the inner platform 12 to the outer platform 14 as suggested in FIG. 4. Each tube 31, 32 is made of woven or braided ceramic-containing fibers so that the tubes 31, 32 do not have a seam that extends radially between the inner platform 12 and the outer platform 14. In the illustrative embodiment, the windows 31W, 32W are formed by machining or cutting the first tube 31 and the second tube 32 after they are partially hardened.

It is contemplated that a method for making the core 30, 230 involves laying up the sublaminates that will ultimately make up the tubes 31, 32, 231, 232 and impregnating them with a temporary matrix to facilitate machining. The sublaminates would then have mating windows 31W, 32W, 231W, 232W machined out such that when assembled, they formed the necessary ribs 25, 225 as illustrated in the figures.

Figure 6:
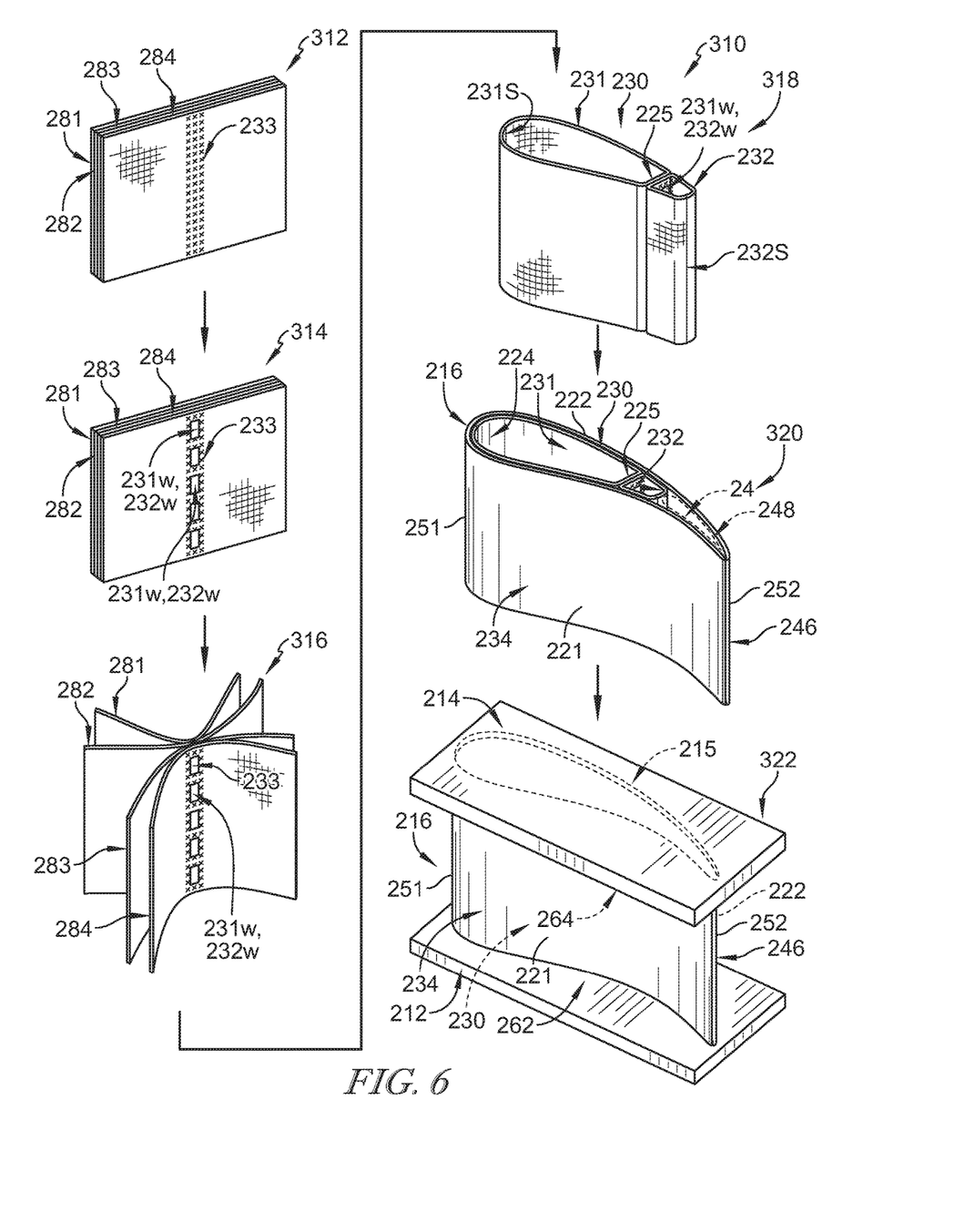
FIG. 6 is a perspective view of a second illustrative method of making a vane assembly.

In some embodiments, first and second tubes 231, 232 included in the core 230 of a turbine vane 210 may be made up of one or more plies (or sheets) of ceramic-containing reinforcements wrapped into a tubular shape with a seam 231S, 232S that extends between the inner platform 212 and the outer platform 214 as suggested in FIG. 6. The seams 231S, 232S may be arranged generally opposite the windows 231W, 232W. In some embodiments, the second tube 232 may be coupled to the first tube 231 by a plurality of stitches 233, glue, or the like to fix the windows 232W of the second tube 232 in alignment with the windows 231W of the first tube 231. The stitches 233 may be made from ceramic-containing fibers. In such embodiments, the windows 231W, 232W may be formed after stitching 233 is applied and before the tubes 231, 232 are hardened.

It is contemplated that instead of impregnating the fabric with a matrix to achieve the necessary material resilience in order to facilitate machining as is used to create windows 31W, 32W, strategic out of plane stitching may be used to fix the reinforcements for creation of the windows 231, 232. As shown in the process of FIG. 6, plies 281, 282, 283, 284 that will form tubes 231, 232 are first laid in a stack and then stitched along a path that will frame the window geometry. Those plies 281, 282, 283, 284, now stitched together and with the necessary windows in the fabric, can be formed into the desired shape to form the interior of the airfoil 216. Finally, all other components of the layup such as fill and outer wrap plies 234 may be added and the airfoil 216 can continue through the densification process.

The overwrap 34 illustratively includes one or more plies 44 of ceramic-containing reinforcement that wraps around the core 30 as shown in FIGS. 2-4. The plies (sometimes called sheets) 44 of ceramic-containing reinforcement is shown wrapped from the trailing edge 52 of the airfoil 16 around the leading edge 51 of the airfoil 16 so that a seam 46 of the overwrap 34 is located at the trailing edge 52. In some embodiments, the seam 46 of the overwrap 34 may be located elsewhere or the overwrap 34 may include a woven or braided tube of ceramic-containing material without a radially-extending seam. The plies 44 are suspended in the ceramic matrix 45 when assembled into the airfoil 16.

A filler 48 may be arranged between the seam 46 of the plies 44 included in the overwrap 34 at the trailing edge 52 of the airfoil 16 and the core 30 as shown in FIGS. 2 and 3. The filler 48, sometimes called a noodle, may comprise chopped fiber or other types of ceramic-containing reinforcement 61 suspended in the ceramic matrix 45.

In the illustrative embodiment, the inner platform 12 and the outer platform 14 comprise ceramic materials adapted to withstand high temperatures. Each of the inner and the outer platforms 12, 14 may be formed to include a corresponding aperture 13, 15 adapted to allow entry and exit of cooling air into and out of the interior 24 of the core 30. Each of the inner and the outer platforms 12, 14 are illustratively coupled to the airfoil 16 by a joint 62, 64 which may be ceramic matrix, bi-casting, braze, pins, fasteners or otherwise connected by coupling means.

In some embodiments, one or both of the inner platform 12 and the outer platform 14 may be made from a metallic material, such as, for example, a nickel-based or cobalt-based super alloy (e.g. Inconel, Waspaloy, etc.). In some such embodiments, the airfoil 16 may be received in an aperture formed in the metallic inner and/or the metallic outer platforms. This arrangement may be designed allow the airfoil 16 to expand and contract at a rate different from that of the metallic inner and/or the metallic outer platforms.

The exemplary turbine vane assembly 10 is shown as a singlet, having one airfoil that extends between the inner platform 12 and the outer platform 14 as shown in FIG. 1. In some embodiments, a turbine vane assembly in accordance with the present disclosure may be a doublet or multi-airfoil segment, having two or more airfoils that extend between the inner platform and the outer platform. In some embodiments, a turbine vane assembly in accordance with the present disclosure may be a full ring, having an inner and/or outer platform that forms a full hoop with multiple airfoils arranged radially between the inner and outer platforms and spaced circumferentially around the full hoop(s). In some embodiments, the vane assembly 10 disclosed herein may be used in the compressor section of a gas turbine engine upon a design need for high temperature capability in the compressor.

In illustrative applications, the airfoil 16 disclosed herein may be also be incorporated into a blade for a gas turbine engine. In such applications, the outer platform 14 may be replaced by a blade tip and/or a blade shroud coupled to the airfoil 16, or simply eliminated in some cases of a shroudless blade. Further, a root and/or other attachment feature may be coupled to the airfoil 16 and/or the inner platform 12 to allow coupling of the airfoil 16 to a turbine disk for rotation therewith. It is also contemplated, in turbine blade applications, that the airfoil 16 may be integrally formed with a disk or ring to form part of a blisk (bladed disk) or bling (bladed ring).

Figure 5:
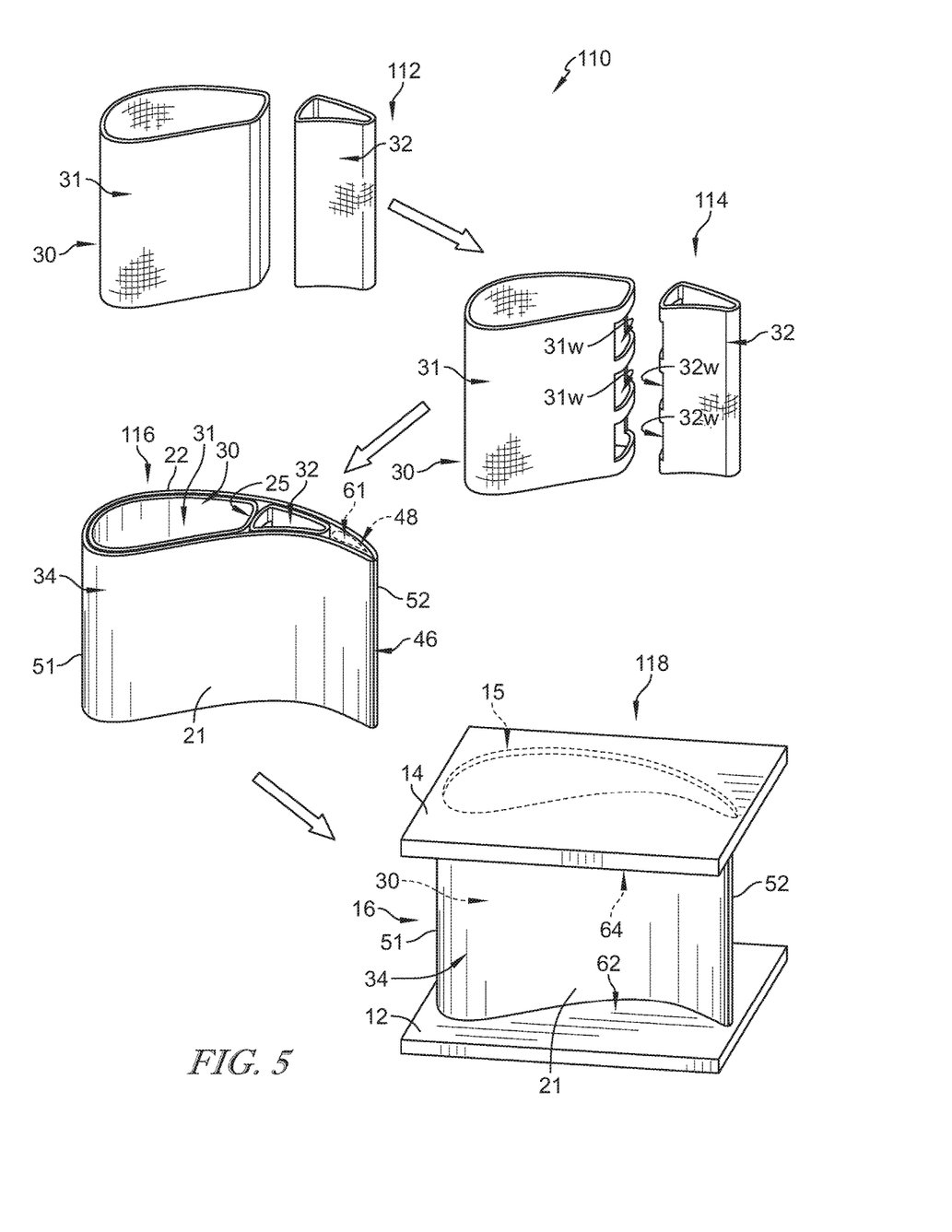
FIG. 5 is a perspective view of an illustrative method of making the vane assembly of FIGS. 1-4.

One method 110 of making the vane assembly 10 shown in FIGS. 1-4 is shown in FIG. 5. The method 110 may include a step 112 of hardening woven or braided first and second tubes 31, 32 of ceramic-containing composite reinforcement in predetermined shapes. A step 114 of machining or cutting out windows 31W, 32W from the tubes 31, 32 may follow step 112. In other embodiments, the windows 31W, 32W may be formed before hardening.

The method 110 may then include a step 116 in which the airfoil 16 is assembled as shown in FIG. 5. The step 116 may include aligning radially-spaced windows 31W formed in the first tube 31 with radially-spaced windows 32W formed in the second tube 32 to form core 30 having ribs 25 spaced radially apart from one another. The step 116 may also include wrapping the overwrap 34 around the core 30 to define the pressure side 21 and the suction side 22 of the airfoil 16. The step 116 may further include co-processing the core 30 and the overwrap 34 to bond the core 30 and the overwrap 34 with ceramic matrix material 45.

The method 110, as illustrated, also includes a step 118 in which the airfoil 16 is coupled to the inner platform 12 and the outer platform 14 as shown in FIG. 5. The airfoil 16 may be coupled to the platforms 12, 14 in step 118 by the creation of joints 62, 64 which may be ceramic matrix, bi-casting, braze, pins, fasteners or otherwise connecting by coupling means.

Wrapping the overwrap 34 around the core 30 may include placing one end of plies 44 along the trailing edge 52 of the airfoil 16 and guiding the plies 44 around the leading edge 51 of the airfoil 16 back to the trailing edge 52 of the airfoil 16 as suggested in FIGS. 2 and 3. The overwrap 34 thus defines the pressure side 21 and the suction side 22 of the airfoil 16. The pressure side 21 and the suction side 22 of the airfoil 16 are interconnected by the plurality of ribs 25.

Co-processing may include co-infiltration of the core 30 and the overwrap 34 Co-infiltration illustratively includes densifying preforms of the core 30 and the overwrap 34. Densifying preforms of the core 30 and the overwrap 34 may include CVD or CVI, slurry infiltration, polymer-infiltration-pyrolysis, and/or melt infiltration. In some embodiments, some CVD or CVI may be applied to the preform of the core 30 ahead of wrapping the overwrap 34 around the core 30.

In some examples a preform of the airfoil 16 may formed by chemical vapor infiltration. In other examples, the preform of the airfoil 16 may be formed by a combination of chemical vapor infiltration, melt infiltration, polymer-infiltration-pyrolysis. In other examples, the preform of the airfoil 16 may be formed by a combination of chemical vapor infiltration and polymer-infiltration-pyrolysis.

The method may also include placing reinforcement fibers 61 (chopped or otherwise) into a space created between the trailing edge 52 of the airfoil 16 defined by the overwrap 34 and the core 30. These reinforcement fibers 61 may become filler 48 upon co-processing with the core 30 and the overwrap 34.

Ceramic-matrix composite materials (CMCs) provide high temperature capability, low density, and low creep at high temperatures when compared to contemporary alloys. These features make manufacturing turbine components out of CMCs an attractive concept, however, this must be done with care to accommodate the lower strength of CMCs versus metallic solutions.

When constructing a CMC airfoil shape for use as a vane, for example, the out of plane stress applied to the material at the leading edge and trailing edge can become prohibitively high due to ballooning loads. One solution to this problem is to manufacture a rib in close proximity to the trailing edge to reduce the loading taken by the fibers wrapping the tight trailing edge radius. However, the rib is then subjected to a thermal stress due to the differential heating of the pressure side and suction side. This leads to desiring a rib that is not continuous in the radial direction to allow for finite sections of the airfoil to expand and contract as needed. The manufacture of an airfoil as here so far described out of fabric layup is a non-trivial problem to which the concepts herein provide a solution.

Another illustrative vane assembly 210 adapted for use in a gas turbine engine is shown in FIG. 6. The vane assembly 210 is substantially similar to the vane assembly 10 shown in FIGS. 1-4 and described herein. Accordingly, similar reference numbers in the 200 series indicate features that are common between the vane assembly 10 and the vane assembly 210. The description of the vane assembly 10 is hereby incorporated by reference to apply to the vane assembly 210, except in instances when it conflicts with the specific description and drawings of the vane assembly 210.

Unlike the vane assembly 10, the vane assembly 210 includes first and second tubes 231, 232 included in the core 230 made up of multiple plies (or sheets) of ceramic-containing reinforcements 281, 282, 283 wrapped into a tubular shape with corresponding seam 231S, 232S that extends between the inner platform 212 and the outer platform 214 as suggested in FIG. 6. The seams 231S, 232S are arranged generally opposite the windows 231W, 232W. In some embodiments, the second tube 232 may be coupled to the first tube 231 by a plurality of stitches 233, glue, or the like to fix the windows 232W of the second tube 232 in alignment with the windows 231W of the first tube 231. The stitches 233 may be made from ceramic-containing fibers.

One method 310 of making the vane assembly 210 is shown in FIG. 6. The method 310 may include a step 312 in which multiple plies (or sheets) of ceramic-containing reinforcements 281, 282, 283 are coupled along a mid-section of the plies 281, 282, 283. The plies 281, 282, 283 may be coupled with stitches 233, glue, or the like. The stitches 233 may be made from a ceramic-containing fiber or from another type of fiber that may be destroyed during further processing.

The method 310 may include a step 116, in which windows 231W, 232W are formed through the plies 281, 282, 283 along the mid-section as shown in FIG. 6. The windows may be formed the by milling or cutting the first tube and the second tube 231, 232 before hardening of the ceramic-containing reinforcements.

The method 310 may include steps 118, 120 as shown in FIG. 6 in which at least one ply 281, 282 is wrapped into the first tube 231 and at least one ply 283, 284 is wrapped into the second tube 232. In the illustrative embodiment, the plies 281, 282 forming the first tube 231 are arranged to form a seam 231S that extends radially and generally opposes the windows 231W of the first tube 231. Further, the plies 283, 284 forming the second tube 232 are arranged to form a seam 232S that extends radially and generally opposes the windows 232W of the second tube 232.

The method 310 may then include a step 122 in which the airfoil 16 is assembled as shown in FIG. 6. The step 122 may include aligning radially-spaced windows 231W formed in the first tube 231 with radially-spaced windows 232W formed in the second tube 232 to form core 230 having ribs 225 spaced radially apart from one another. The step 122 may also include wrapping the overwrap 234 around the core 230 to define the pressure side 221 and the suction side 222 of the airfoil 216. The step 122 may further include co-processing the core 230 and the overwrap 234 to bond the core 230 and the overwrap 234 with ceramic matrix material 245.

The method 310, as illustrated, also includes a step 324 in which the airfoil 216 is coupled to the inner platform 212 and the outer platform 214 as shown in FIG. 6. The airfoil 216 may be coupled to the platforms 212, 214 in step 124 by the creation of joints 262, 264 which may be ceramic matrix, bi-casting, braze, pins, fasteners or otherwise connecting by coupling means.

Figure 7:
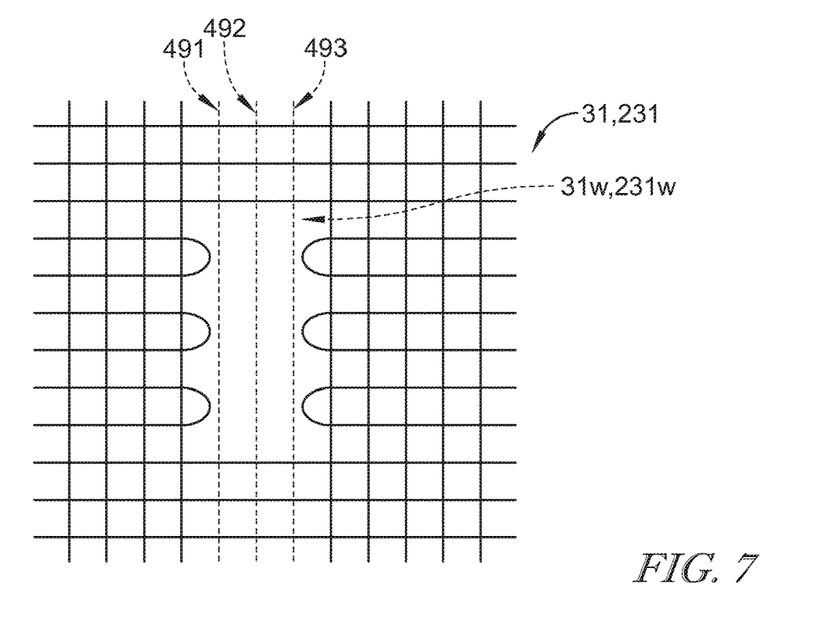
FIG. 7 is a front elevation view of an illustrative ply of ceramic-containing reinforcement used to form a tube having windows showing that sacrificial fibers (shown as dashed line) are woven into the ply to support the formation of windows in the tube made from the ply when the sacrificial fibers are destroyed by the manufacturing method.
Figure 8:
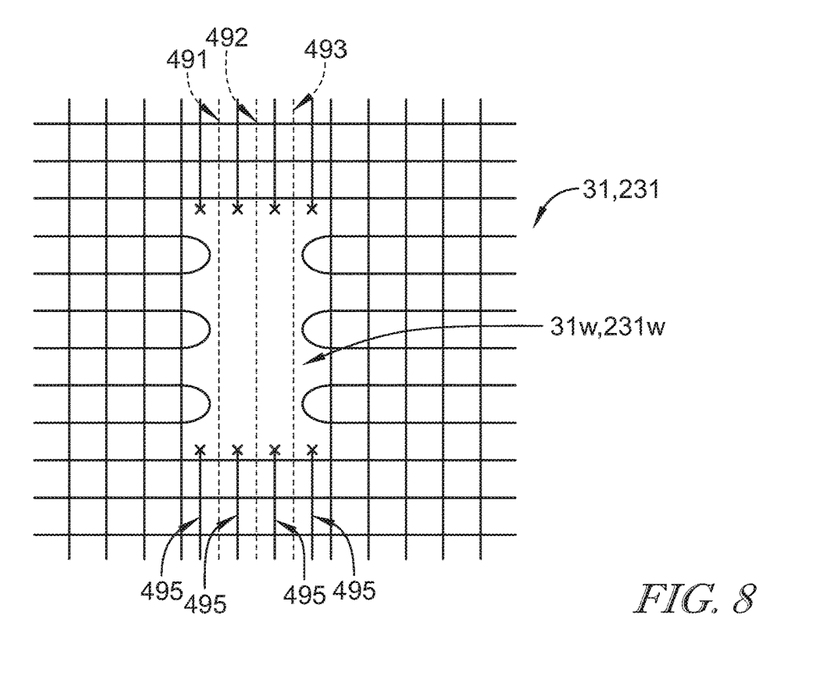
FIG. 8 is a view similar to FIG. 7 in which additional structural fibers (solid with an x-end) are added to compensate for weakness in the ply created by removal of the sacrificial fibers (shown as dashed line)

In an alternative embodiment, the windows 31W, 32W, 231W, 232W may be formed by removal of fugitive fibers 491, 492, 493 woven into the first tube 31, 231 (and/or the second tube 32, 232) as suggested in FIGS. 7 and 8. More specifically, the windows 31W, 231W may be formed by strategically manipulating fiber geometry in the fabric before construction in order to form the necessary gaps in the material to facilitate the formation of a non-continuous rib. This could be done using fugitive fibers in the fabric that are destroyed during the manufacturing process of the airfoil 16, 216, leaving a gap in the weave wherever they were present. These fugitive fibers could be positioned so that when destroyed, they would leave the necessary window geometry behind. Illustrated in FIGS. 7 and 8 are two examples of the use of the fugitive (dashed) fibers, strategically interwoven with the structural fiber (solid) to achieve the desired result. In the embodiment illustrated in FIG. 8, structural fibers 495 (solid with x-ends) could then be woven or distributed as shown to compensate for the introduced weakness.

Figure 9:
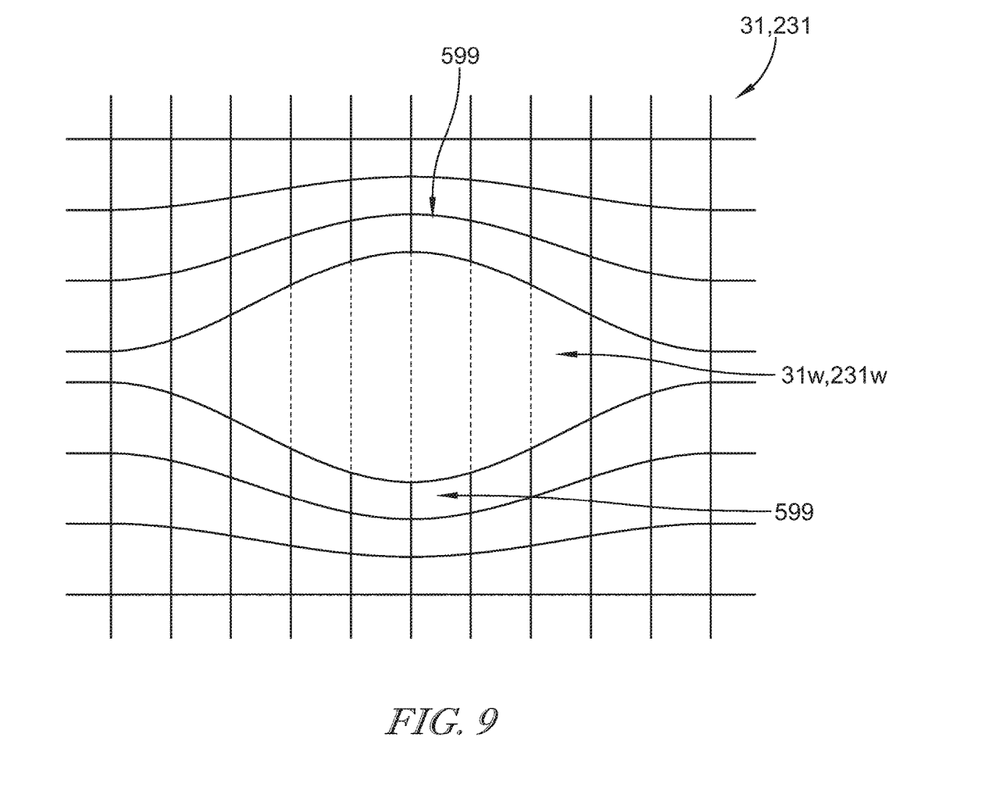
FIG. 9 is a front elevation view of a third illustrative ply of ceramic-containing reinforcement used to form a tube having windows showing that a punch has been pushed through the ply to spread fibers of the ply to support the formation of windows in the tube made from the ply.

In another alternative embodiment, the windows 31W, 32W, 231W, 232W may be formed by pushing a punch or other tool through fibers of the first tube 31, 231 (and/or the second tube 32, 232) to spread the fibers apart as suggested in FIG. 9. More specifically, the desired architecture is achieved through manipulation of the fabric fiber geometry. This method involves mechanically relocating the fibers in the vicinity of the desired architectural effect. As shown in FIG. 9, the fibers would be redirected to achieve a void where the window 31W, 231W between ribs 25, 225 would need to be located, either before layup or after initial CVI. Using this method, fibers in the hoop direction may be maintained, resulting in regions 599 of higher fiber density at the extremities of the resulting window. The regions 599 of higher fiber density at the extremities of the resulting window may result in greater strength capability of the resulting structure in that direction.

Figures 10, 11:
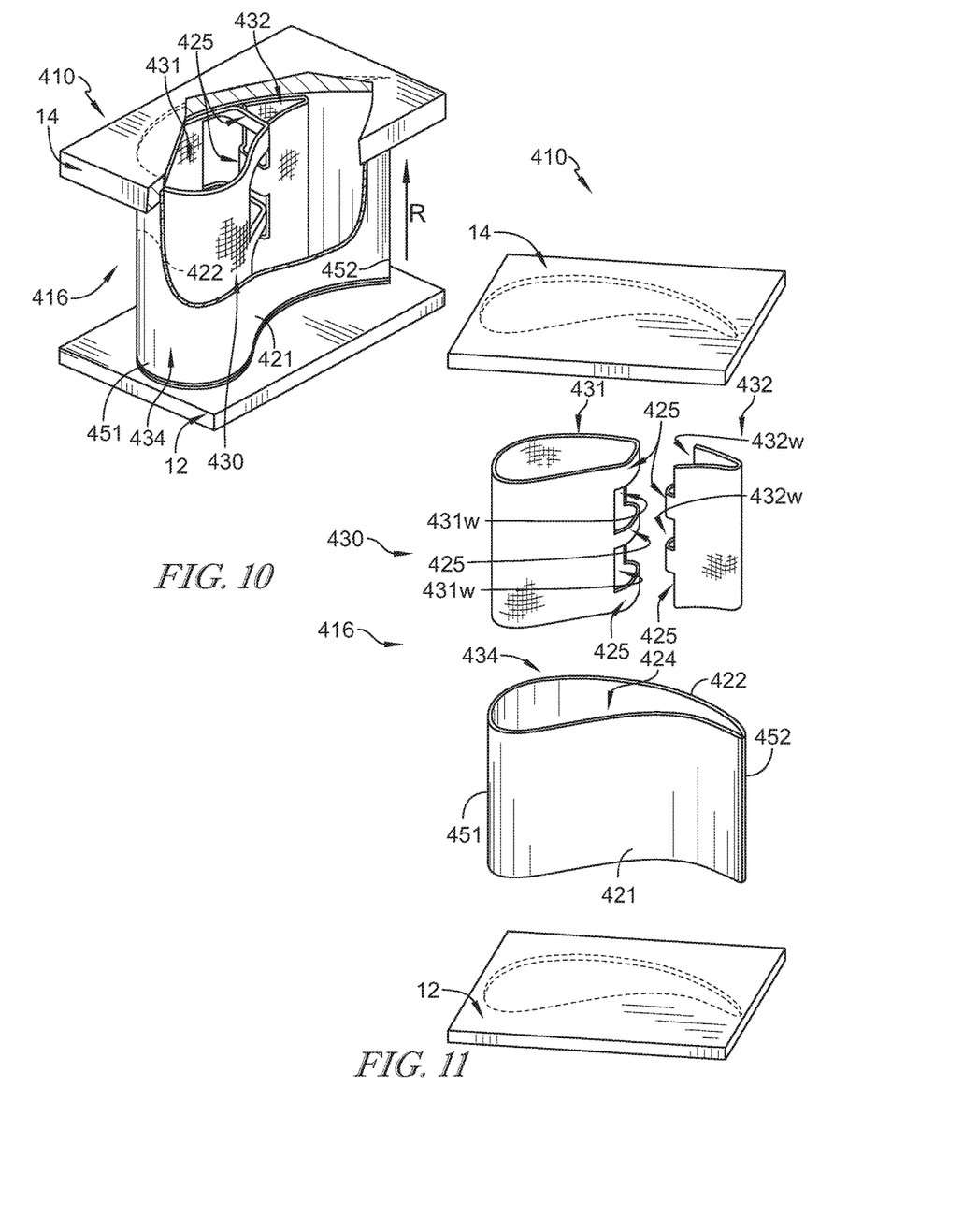
FIG. 10 is perspective view of another vane assembly adapted for use in a gas turbine engine, the vane assembly cutaway to show that an outer wrap of an airfoil included in the vane assembly wraps around first and second tubes that cooperate to form a core of the airfoil and showing that the first and second tubes are formed to windows that are offset from each other radially such that discontinuous ribs are formed by the core.
FIG. 11 is an exploded perspective assembly view of the vane assembly of FIG. 10 showing that ribs formed by the first tube included in the core define the windows of the first tube and that each rib of the first tube is offset from ribs formed by the second tube.

Another illustrative turbine vane assembly 410 for use in a gas turbine engine is shown in FIGS. 10 and 11. The turbine vane 410 includes inner platform 12, outer platform 14, and an airfoil 416. The airfoil 416 extends in the radial direction R from the inner platform 12 to the outer platform 14 and comprises ceramic-matrix composite materials adapted to withstand high temperatures.

The airfoil 416 is shaped to redirect hot gasses before those gasses act on rotating blades arranged aft of the airfoil 416 as suggested in FIG. 10. The airfoil 416 is formed to include a pressure side 421, a suction side 422, and a plurality of radially discontinuous and staggered ribs 425 that extend through an interior space 424 of the airfoil 416 as shown in FIG. 10. The ribs 425 are illustratively spaced radially apart from one another between the inner platform 12 and the outer platform 14.

The illustrative airfoil 416 includes a core 430 and an overwrap 434 as shown in FIGS. 10 and 11. The core 430 includes a first and a second tube of ceramic-containing reinforcement material 431, 432 each formed to include windows 431W, 432W that are radially misaligned with one another so that material of the first tube 431 and the second tube 432 provide radially offset ribs 425. The overwrap 434 wraps around the core 430 to hold the core 430 together and to form the pressure side 421 and the suction side 422 of the airfoil 416. When assembled, the core 430 and the overwrap 434 are bonded together by ceramic matrix 445.

The first tube 431 and the second tube 432 of the core 430 illustratively extend all the way from the inner platform 12 to the outer platform 14 as suggested in FIG. 10. Each tube 431, 432 is made of woven or braided ceramic-containing fibers so that the tubes 431, 432 do not have a seam that extends radially between the inner platform 12 and the outer platform 14. In the illustrative embodiment, the windows 431W, 432W are formed by machining or cutting the first tube 431 and the second tube 432 after they are partially hardened. Methods 110, 310 may be slightly modified to produce the vane assembly 410.

Figures 12, 13:
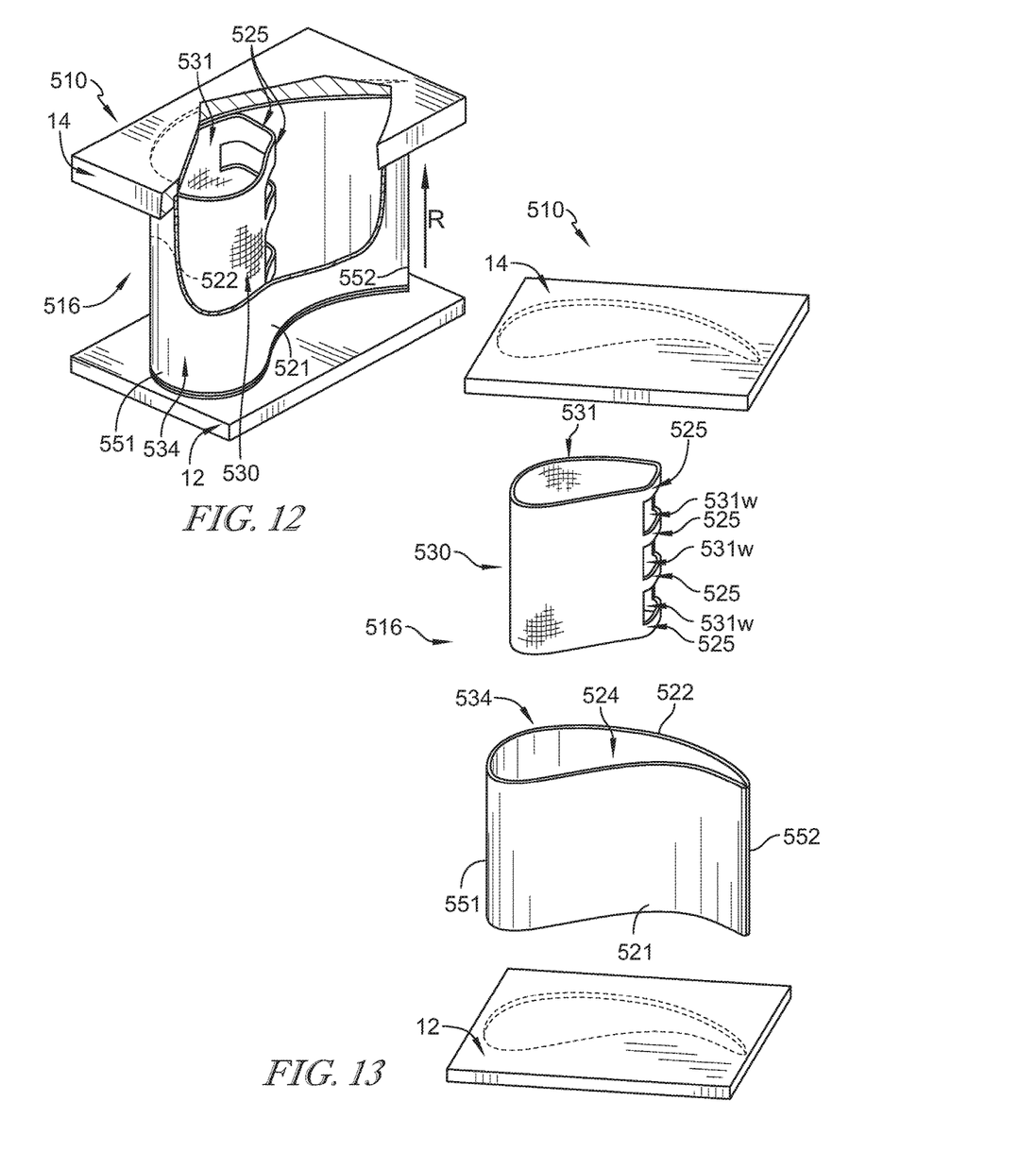
FIG. 12 is perspective view of another vane assembly adapted for use in a gas turbine engine, the vane assembly cutaway to show that an outer wrap of an airfoil included in the vane assembly wraps around a single tube to form a core of the airfoil.
FIG. 13 is an exploded perspective assembly view of the vane assembly of FIG. 12 showing that the tube is formed to have windows that are offset from each other radially by ribs that are radially spaced apart from one another.

Another illustrative turbine vane assembly 510 for use in a gas turbine engine is shown in FIGS. 12 and 13. The turbine vane 510 includes inner platform 12, outer platform 14, and an airfoil 516. The airfoil 516 extends in the radial direction R from the inner platform 12 to the outer platform 14 and comprises ceramic-matrix composite materials adapted to withstand high temperatures.

The airfoil 516 is shaped to redirect hot gasses before those gasses act on rotating blades arranged aft of the airfoil 516 as suggested in FIG. 12. The airfoil 516 is formed to include a pressure side 521, a suction side 522, and a plurality of radially discontinuous ribs 525 that extend through an interior space 524 of the airfoil 516 as shown in FIG. 12. The ribs 525 are illustratively spaced radially apart from one another between the inner platform 12 and the outer platform 14.

The illustrative airfoil 516 includes a core 530 and an overwrap 534 as shown in FIGS. 12 and 13. The core 530 includes a tube of ceramic-containing reinforcement material 531 formed to include windows 531W so that material of the tube 531 provides radially offset ribs 525. The overwrap 534 wraps around the core 530 to hold the core 530 together and to form the pressure side 521 and the suction side 522 of the airfoil 516. When assembled, the core 530 and the overwrap 534 are bonded together by ceramic matrix 545.

The tube 531 of the core 530 illustratively extends all the way from the inner platform 12 to the outer platform 14 as suggested in FIG. 12. The tube 531 is made of woven or braided ceramic-containing fibers so that the tube 531 does not have a seam that extends radially between the inner platform 12 and the outer platform 14. In the illustrative embodiment, the windows 531W are formed by machining or cutting the tube 531 after it is partially hardened. Methods 110, 310 may be slightly modified to produce the vane assembly 510.

Figures 14, 15, 16:
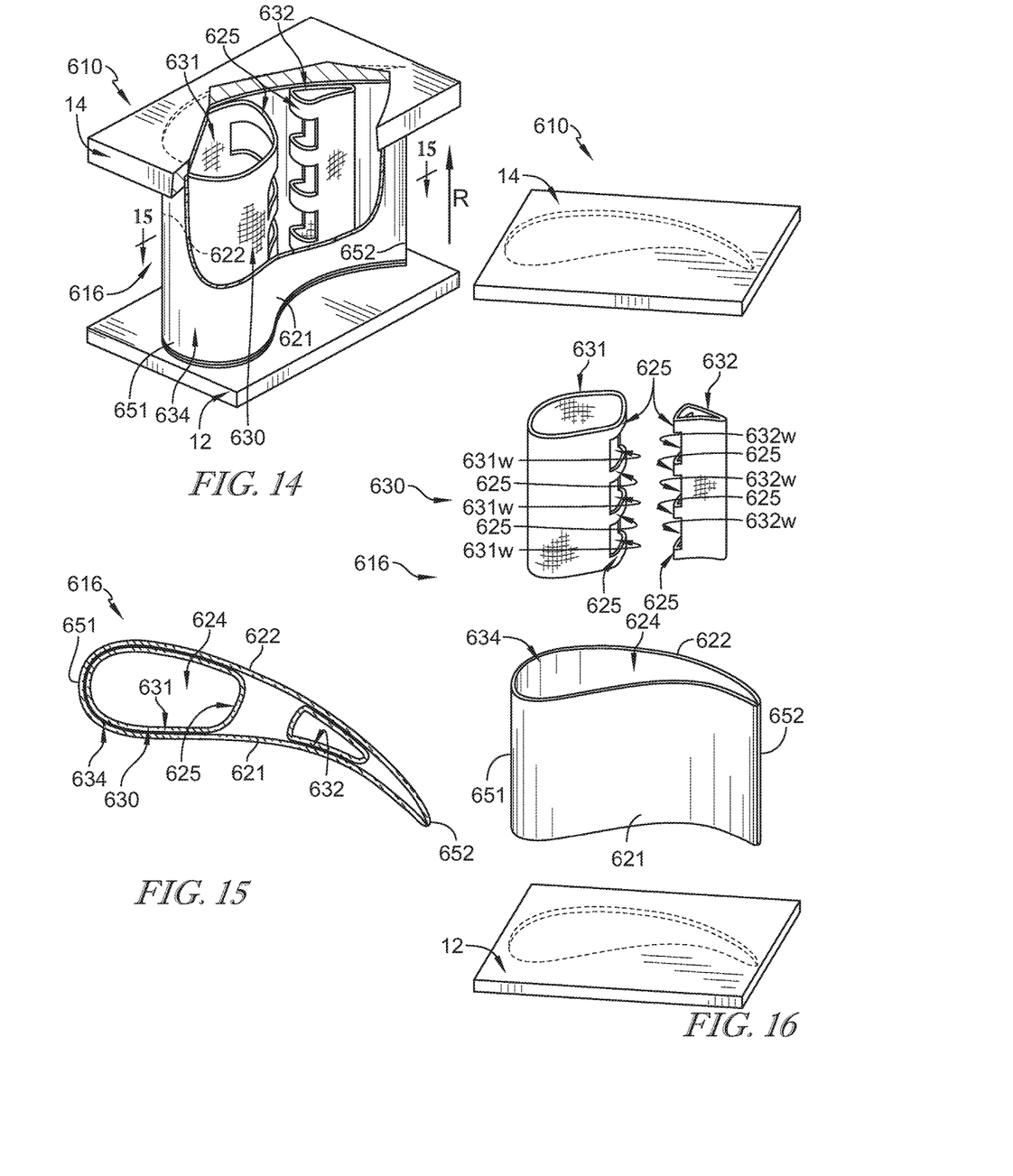
FIG. 14 is perspective view of yet another vane assembly adapted for use in a gas turbine engine, the vane assembly cutaway to show that an outer wrap of an airfoil included in the vane assembly wraps around first and second tubes that cooperate to form a core of the airfoil and showing that the first and second tubes each form radially discontinuous ribs within the core.
FIG. 15 is a cross sectional view of FIG. 14 taken along line 15-15 to show that the discontinuous ribs formed by the first tube and the second tube are spaced axially apart from one another within the airfoil.
FIG. 16 is an exploded view of the vane assembly of FIG. 14 showing that the first and second tubes are formed to windows partially defined by the discontinuous ribs.

Yet another illustrative turbine vane assembly 610 for use in a gas turbine engine is shown in FIGS. 14-16. The turbine vane 610 includes inner platform 12, outer platform 14, and an airfoil 616. The airfoil 616 extends in the radial direction R from the inner platform 12 to the outer platform 14 and comprises ceramic-matrix composite materials adapted to withstand high temperatures.

The airfoil 616 is shaped to redirect hot gasses before those gasses act on rotating blades arranged aft of the airfoil 616 as suggested in FIG. 14. The airfoil 616 is formed to include a pressure side 621, a suction side 622, and a plurality of radially discontinuous ribs 625 that extend through an interior space 624 of the airfoil 616 as shown in FIG. 14. The ribs 625 are illustratively spaced radially apart from one another between the inner platform 12 and the outer platform 14.

The illustrative airfoil 616 includes a core 630 and an overwrap 634 as shown in FIGS. 14-16. The core 630 includes a first and a second tube of ceramic-containing reinforcement material 631, 632 each formed to include windows 631W, 632W so that material of the first tube 631 and the second tube 632 provide radially offset ribs 625. In the illustrated embodiment, the first tube 631 and the second tube 632 are spaced apart from one another within the overwrap 634 such that ribs 625 formed by each tube 631, 632 are spaced apart from one another (illustratively along a chord length of the airfoil 616). The overwrap 634 wraps around the core 630 to hold the core 630 together and to form the pressure side 621 and the suction side 622 of the airfoil 616. When assembled, the core 630 and the overwrap 634 are bonded together by ceramic matrix 645.

The first tube 631 and the second tube 632 of the core 630 illustratively extend all the way from the inner platform 12 to the outer platform 14 as suggested in FIG. 14. Each tube 631, 632 is made of woven or braided ceramic-containing fibers so that the tubes 631, 632 do not have a seam that extends radially between the inner platform 12 and the outer platform 14. In the illustrative embodiment, the windows 631W, 632W are formed by machining or cutting the first tube 631 and the second tube 632 after they are partially hardened. Methods 110, 310 may be slightly modified to produce the vane assembly 610.

Embodiments of the present disclosure are illustrative in nature and other specific designs could include features described herein while falling within the scope of exclusion requested in the present application. Moreover, features of the disclosed embodiments may be mixed or matched to arrive at other suitable designs including more or fewer inner tubes each with or without windows.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A vane assembly for a gas turbine engine, the assembly comprising
    an inner platform and an outer platform spaced apart from the inner platform to define a gas path therebetween, and
    a ceramic-matrix composite airfoil that extends from the inner platform to the outer platform across the gas path, the ceramic-matrix composite airfoil formed to include a pressure side, a suction side, and a plurality of axially-aligned ribs spaced radially apart from one another between the inner platform and the outer platform that interconnect the pressure side with the suction side,
    wherein the ceramic-matrix composite airfoil includes (i) a core comprising ceramic-containing reinforcements and having a first tube formed to include windows and a second tube formed to include windows, and (ii) an overwrap that wraps around the core to form the pressure side and the suction side of the airfoil,
    wherein the windows of the second tube are aligned with the windows of the first tube so that the plurality of axially-aligned ribs are formed by material of the first tube and the second tube arranged between the windows of the first tube and the windows of the second tube, and
    wherein the second tube is coupled to the first tube by a plurality of stitches in the plurality of axially-aligned ribs to fix the windows of the second tube in alignment with the windows of the first tube.

2. The assembly of claim 1, wherein the first tube and the second tube extend from the inner platform to the outer platform.

3. The assembly of claim 1, wherein the first tube is woven or braided so that the first tube does not have a seam that extends radially between the inner platform and the outer platform.

4. The assembly of claim 3, wherein the second tube is woven or braided so that the second tube does not have a seam that extends radially between the inner platform and the outer platform.

5. The assembly of claim 1, wherein the first tube is made from at least one wrapped ply of the ceramic-containing reinforcement arranged to form a seam that extends radially between the inner platform and the outer platform.

6. The assembly of claim 5, wherein the seam is arranged opposite the windows formed in the first tube.

7. The assembly of claim 5, wherein the second tube is made from at least one wrapped ply of the ceramic-containing reinforcement arranged to form a seam that extends radially between the inner platform and the outer platform.

8. The assembly of claim 1, wherein the material of the first tube arranged between the windows of the first tube is in contact with and is bonded to the material of the second tube arranged between the windows of the second tube by ceramic matrix material.

9. The assembly of claim 1, wherein the overwrap includes at least one ply of the ceramic-containing reinforcement that wraps around the core and is bonded to the core by ceramic matrix material and the at least one ply of ceramic-containing reinforcement included in the overwrap extends from along a trailing edge of the airfoil around a leading edge of the airfoil and back to the trailing edge of the airfoil to form a seam along the trailing edge of the airfoil.

10. A ceramic-matrix composite airfoil adapted for use in a gas turbine engine, the airfoil comprising
    a core comprising ceramic-containing reinforcements and including a first tube formed to include windows, and
    an overwrap that wraps around the core to form the pressure side and the suction side of the airfoil,
    wherein a plurality of ribs that extend between the pressure side and the suction side are formed by material of the first tube arranged between the windows of the first tube,
    wherein the core includes a second tube formed to include windows that face the windows of the first tube, and
    wherein the second tube is coupled to the first tube by a plurality of stitches in the plurality of ribs to fix the windows of the second tube in alignment with the windows of the first tube.

11. The airfoil of claim 10, wherein the first tube is woven or braided so that the first tube does not have a seam that extends radially between an inner end and an outer end.

12. The airfoil of claim 10, wherein the first tube is made from at least one wrapped ply of the ceramic-containing reinforcement arranged to form a seam that extends radially between the inner end and the outer end.

13. The airfoil of claim 12, wherein the seam is arranged generally opposite the windows formed in the first tube.

* * * * *